United States Patent [19]

Smith, III

[11] Patent Number: 5,469,887
[45] Date of Patent: Nov. 28, 1995

[54] HYDRAULIC COUPLING WITH PRESSURE EQUALIZING VALVE

[75] Inventor: Robert E. Smith, III, Stafford, Tex.

[73] Assignee: National Coupling Inc., Stafford, Tex.

[21] Appl. No.: 411,943

[22] Filed: Mar. 28, 1995

[51] Int. Cl.⁶ ................................................ F16L 37/28
[52] U.S. Cl. ................... 137/614.04; 137/81.2; 137/614.2; 251/149.7
[58] Field of Search ............. 137/614.04, 614.2, 137/81.2, 606; 251/149.6, 149.7, 149.1

[56] References Cited

U.S. PATENT DOCUMENTS

| | | |
|---|---|---|
| 1,913,982 | 12/1931 | Fox . |
| 2,471,237 | 7/1948 | Pasturczak . |
| 2,480,108 | 8/1949 | Barker . |
| 2,776,850 | 1/1957 | Hawk . |
| 3,291,152 | 12/1966 | Comer . |
| 3,362,720 | 1/1968 | Henry et al. . |
| 3,422,864 | 12/1968 | Allinquant . |
| 3,618,690 | 11/1971 | Johnson . |
| 3,730,221 | 5/1973 | Vik . |
| 3,917,220 | 11/1975 | Gilmore . |
| 4,124,228 | 11/1978 | Morrison . |
| 4,637,470 | 1/1987 | Weathers et al. . |
| 4,694,859 | 9/1987 | Smith, III . |
| 4,709,726 | 12/1987 | Fitzgibbons . |
| 4,754,780 | 7/1988 | Smith, III . |
| 4,768,538 | 9/1988 | Mintz et al. . |
| 4,813,454 | 3/1989 | Smith, III . |
| 4,817,668 | 4/1989 | Smith, III . |
| 4,832,080 | 5/1989 | Smith, III . |
| 4,834,139 | 5/1989 | Fitzgibbons . |
| 4,858,648 | 8/1989 | Smith, III . |
| 4,884,584 | 12/1989 | Smith, III . |
| 4,900,071 | 2/1990 | Smith, III . |
| 4,915,419 | 4/1990 | Smith, III . |
| 5,015,016 | 5/1991 | Smith, III . |
| 5,016,671 | 5/1991 | Barwise ............... 137/614.04 |
| 5,029,613 | 7/1991 | Smith, III . |
| 5,052,439 | 10/1991 | Smith, III . |
| 5,099,882 | 3/1992 | Smith, III . |
| 5,339,861 | 8/1994 | Smith, III . |

Primary Examiner—Martin P. Schwadron
Assistant Examiner—Kevin L. Lee
Attorney, Agent, or Firm—Arnold, White & Durkee

[57] ABSTRACT

A hydraulic coupling having a pressure-equalizing valve in the female coupler body is disclosed. A passage extends between the central bore or receiving chamber and the external surface of the female member. A valve in the passage allows sea water to flow into the annulus during connection or disconnection of the male and female coupling members, thus equalizing the pressure and preventing implosion of seals during disconnection of the coupling members.

16 Claims, 2 Drawing Sheets

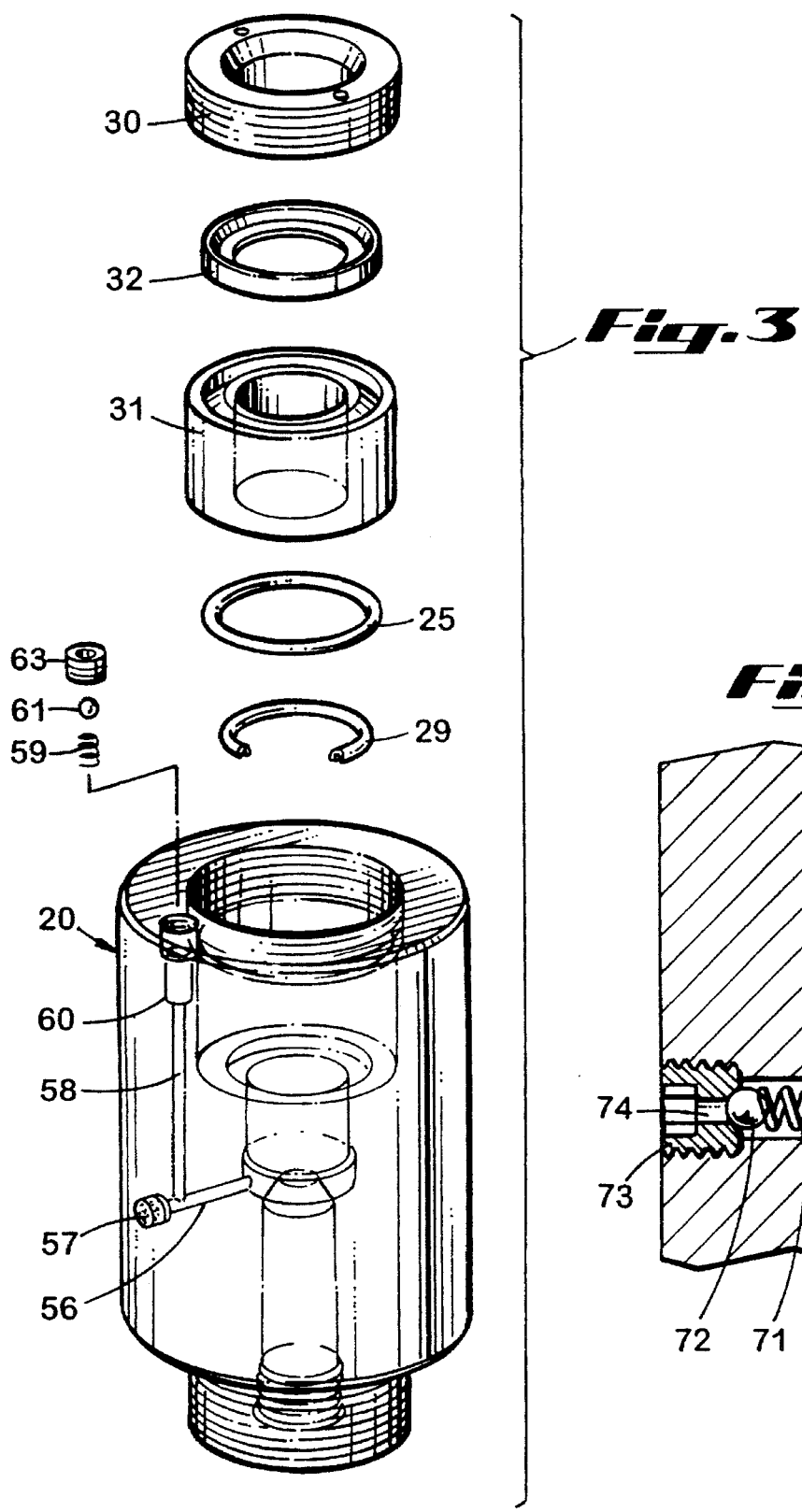

5,469,887

HYDRAULIC COUPLING WITH PRESSURE EQUALIZING VALVE

BACKGROUND OF THE INVENTION

1. Field of the Invention

This invention relates in general to hydraulic couplings, and specifically to hydraulic couplings used in undersea drilling and production applications. More particularly, this invention involves a hydraulic coupling having a pressure-equalizing passage and valve in the female coupler body, allowing sea water to flow into the annulus between the female and male coupling members.

2. Description of the Related Art

Subsea hydraulic couplings are old in the art. The couplings generally consist of a male member and a female member with sealed fluid passageways connected therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore of the female member of the coupling. The male member also includes a connection at its other end to facilitate connection to hydraulic lines. When the cylindrical portion of the male member is inserted into the large bore of the female member, accordingly to various embodiments of the device, fluid flow is established between the male and female members. Couplings of this type are shown in U.S. Pat. No. 4,694,859 to Robert E. Smith III, and other patents owned by National Coupling Company, Inc. of Stafford, Tex.

In undersea drilling and production applications, the male member of the coupling may be connected to a manifold plate or other securement at a sub-sea location at the inside or outside of the well bore. In many cases, the male members are positioned so that the end or leading face of each member faces up from the sea floor. The female members, which also may be secured to a manifold plate, are moved into position over the male members and then lowered onto the male members by a diver or sub-sea vehicle. When the female members are positioned on the male members, hydraulic fluid flow typically is from the female member to the male member of each coupling. In some cases, only the female member of the coupling has a poppet valve.

The poppet valve typically includes a conical valve face which seats, in the closed position, against the valve seat of the coupling member. The poppet valve opens to allow fluid flow, and closes against the valve seat within the bore to arrest the flow. Generally, the poppet valve is spring biased to the closed position. The valve may include a valve actuator which may be a nose or stem extending from the apex of the valve face along the longitudinal axis of the poppet valve.

Undersea hydraulic couplings of the foregoing type are connected and disconnected while sub-sea. In emergency situations, for example, storms, hurricanes, etc., the coupling members must be quickly disconnected and one of the members, typically the female member, removed from the sub-sea location. When the male member is withdrawn from the large central bore of the female member, there is a resulting low pressure area or vacuum created within the bore. When the end face of the male member passes the mid point of the elastomeric seal in the bore of the female member, the seal no longer has the outer wall of the male member to help retain the seal in its grove. At this point, the pull of the vacuum and the hydraulic pressure of sea water trying to get past the elastomeric seal may implode the seal out of the grove and into the annulus between the male and female members. The vacuum also increases the difficulty of manually disengaging the male member from the female member. This resistance to disengagement due to the vacuum is magnified when multiple couplings and manifold plates are disengaged.

SUMMARY OF THE INVENTION

The present invention resides in a hydraulic undersea coupling of the foregoing type, including male and female members for fluid communication therebetween with a pressure equalizing passage and valve in the female member body. When internal pressure is greater than sea pressure, the valve closes and seats to prevent loss of internal hydraulic fluid. When internal pressure of the hydraulic fluid in the system is reduced to less than the sea pressure, the sea pressure opens the valve and allows sea water to flow into the annulus between the coupling members. The valve pressure balances the seals between the members to prevent implosion of the seals when the male member is removed from the female member bore. The valve acts as a vacuum break to prevent a vacuum in the annulus between the members as the male member is being removed from the female member bore. The present invention also reduces the force necessary to remove the male member from the female member bore. The valve of the present invention is preferably a ball valve that is spring biased into the closed position against a valve seat.

BRIEF DESCRIPTION OF THE DRAWINGS

FIG. 3 is a perspective view of a female member of a coupling of the present invention, with the body partially cut away.

FIG. 4 is a section view of a ball valve according to a second embodiment of the present invention.

DETAILED DESCRIPTION OF A PREFERRED EMBODIMENT

A preferred embodiment of the present invention comprises a male member 10, a female member 20 and fluid passages establishing fluid communication between the male member and female member. When the male member is inserted into the female member receiving chamber 23, fluid communication between the members is established when the actuators of the poppet valves 40 and 55 are mutually engaged.

Figure 1:
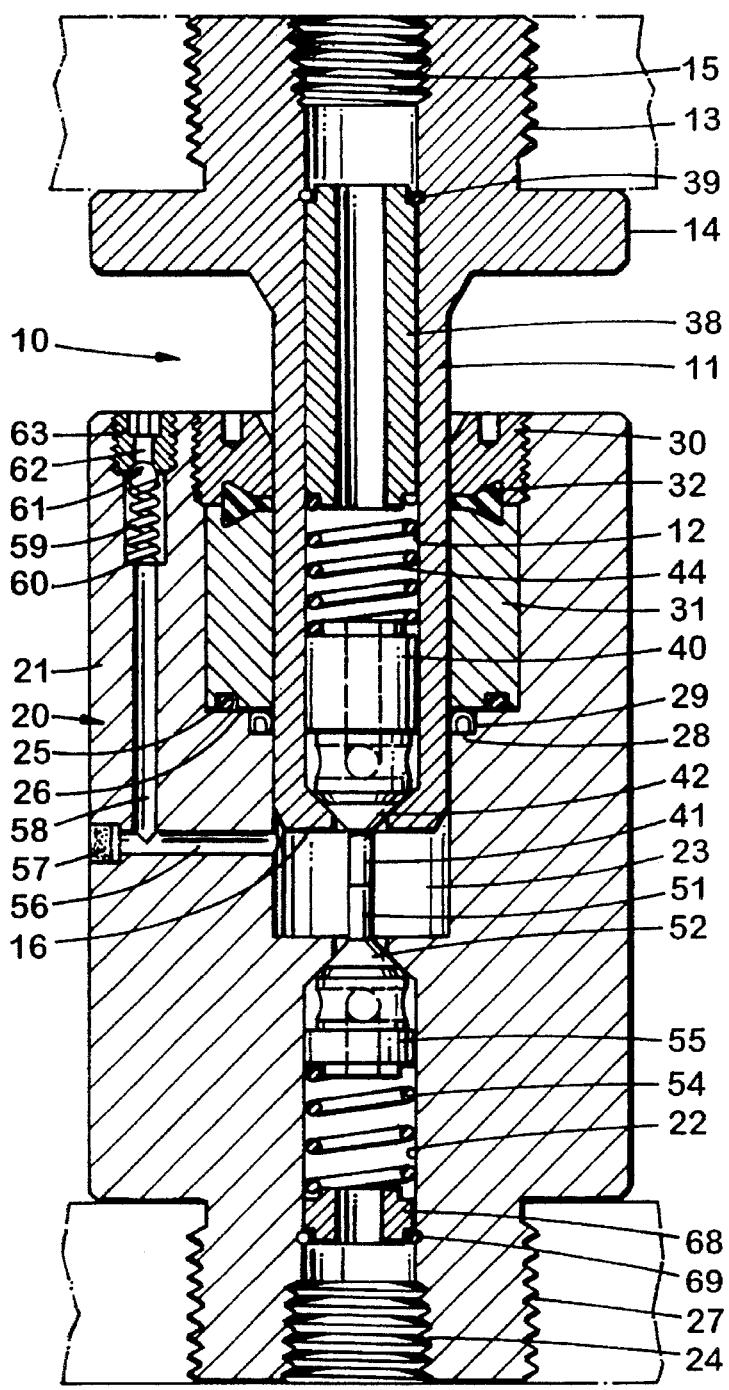
FIG. 1 is a sectional view of the male and female coupling members according to first embodiment of the present invention with the male member partially removed from the female member bore.

FIG. 1 is a sectional view of the male and female coupling members showing the male member partially inserted into the female member. As shown in FIG. 1, male member 10 comprises a probe 11 with a longitudinal bore 12 extending therethrough and a poppet valve 40 slidably received in the bore. The male member also comprises a shoulder 14 and a handle 13 which optionally is threaded or otherwise connected to a manifold plate. The male member bore 12 has a threaded section 15 for connection to hydraulic lines.

Preferably, poppet valve 40 includes a valve face 42 and a valve actuator 41 which extends from the apex of the valve face. The valve face seals against a seat in the male member bore 12 adjacent the leading face 16 of the male member. The poppet valve is urged into the closed position by poppet valve spring 14. The poppet valve spring 44 is positioned between the poppet valve 40 and retainer 38. The retainer 38 preferably includes an internal passageway and is anchored in the male member bore 12 by retainer clip 39.

Female member 20 comprises a body 21, a central bore 22, a poppet valve 55, and a receiving chamber 23 for slidably receiving the male member therein. Poppet valve 55 is substantially similar to the popper valve 40 of the male member and comprises a conical valve face 52 and a valve actuator 51 extending therefrom, a valve spring 54 urging the poppet valve 55 into the closed position, retainer 68, and retainer clip 69. When valve actuator 41 of the male member poppet valve contacts valve actuator 51 of the female member, the mutual engaged poppet valves open to allow fluid passage between the male and female coupling members. At one end of the female member body is a threaded handle 27 for connection to manifold plates and the like. The female member bore 22 also is provided with a threaded section 24 for connection to hydraulic lines.

In a preferred embodiment, the receiving chamber 23 has at least one circumferential shoulder which may be used for positioning a seal and seal retainer. In the embodiment of FIG. 1, circumferential shoulder 28 is located intermediate the receiving chamber and a hollow, ring shaped metal seal 29 is positioned on the shoulder. The seal 29 has an internal cavity which is expansible in response to hydraulic fluid pressure to seal radially between the receiving chamber and the probe 11. To hold seal 29 in place upon disconnection of the male and female coupling members, seal retainer 31 is inserted into the female member. In the embodiment of FIG. 1, seal retainer 31 is a sleeve shaped member having an outer diameter dimensioned to slide into the receiving chamber and an inner diameter dimensioned to receive probe 11 therethrough. Seal retainer 31 is held in place with retainer locking member 30 which is threaded to the receiving chamber. Alternatively, the retainer locking member may comprise a lock ring or clip to hold the seal retainer in place. The seal retainer may be used to axially compress the radial metal seal 29, such axial compression urging the inner circumference of the metal seal inwardly against the probe 11. Seal retainer 31 abuts annular shoulder 26 in the receiving chamber. An O-ring or elastomeric seal 25 may be used for a backup seal between the retainer 31 and shoulder 26.

In the embodiment of FIG. 1, elastomeric seal 32 is positioned between the seal retainer 31 and retainer locking member 30. As shown, elastomeric seal 32 has a dovetail cross section to fit between seal retainer 31 and retainer locking member 30 to help prevent implosion of the seal into the receiving chamber when the male member is removed therefrom. The elastomeric seal 32 seals radially against the probe 11.

The pressure-equalizing passage extends between the receiving chamber and the external surface of the female member body. The pressure-equalizing valve in the passage is preferably a ball valve comprising ball 61 and spring 59 to urge the ball against seat 63. Thus, the ball valve is spring biased to the closed position. In the embodiment of FIG. 1, the pressure-equalizing passage comprises radial passage 56 which extends from the receiving chamber outwardly and connects to longitudinal passage 58. Seat 63 has a threaded outer diameter for attachment to the female member body and includes an internal passage 62. Preferably, spring 59 abuts shoulder 60. When internal pressure in the coupling combined with the force from spring 59 is greater than sea pressure, ball 61 remains closed against seat 63, preventing loss of internal fluid. When internal pressure in the coupling and spring bias is less than sea pressure, this forces the ball away from the seat and allows sea water to flow into the annulus between the male member and female member.

The present invention equalizes the pressure in the coupling and prevents implosion of the seals when the male member is removed from the female member bore. As shown in FIG. 1, when the male member is partially withdrawn from the receiving chamber, the valves are closed, yet the male member remains sealed with the receiving chamber by seals 29 and 32. This results in a low pressure area in the receiving chamber adjacent the leading face of the male member. With the present invention, however, external pressure of sea water exceeds the internal pressure and spring force, opening the ball valve so that the low pressure area receives sea water to pressure-equalize the coupling.

Figure 2:
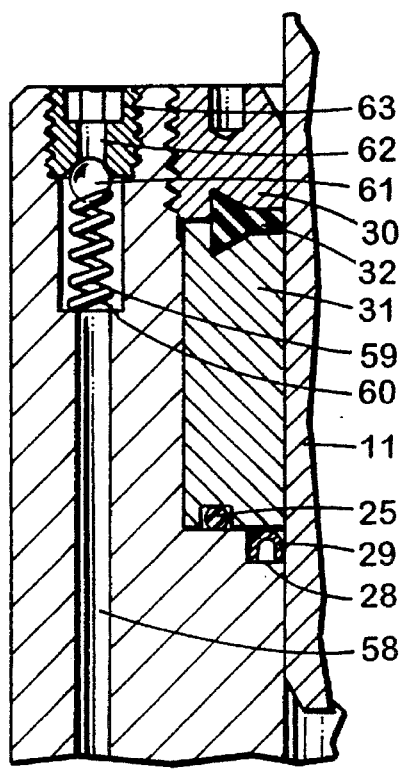
FIG. 2 is a sectional view of the ball valve according to a preferred embodiment of the present invention.

FIG. 2 shows an expanded sectional view of the pressure-equalizing valve according to a preferred embodiment. As shown in FIG. 2, ball 61 closes against seat 63 to block passage 62.

FIG. 3 shows the female member of coupling with outer retainer 30, elastomeric dovetail seal 32, retainer sleeve 31, O-ring 25, and pressure energized metal seal 29, all of which may be inserted into the receiving chamber in the female member. Also shown in FIG. 3 are radial passage 56, longitudinal passage 58 and the components of the ball valve assembly, including ball 61, spring 59 which abuts shoulder 60, and seat 63. Preferably, passage 56 is drilled into the female body 21 and is sealed with plug 57.

FIG. 4 shows a second or alternative embodiment of the present invention in which the pressure-equalizing passage is radial passage 75 between the receiving chamber and outer circumference of the female member body. The ball valve comprises ball 72 which seals against seat 73 to block passage 74. Valve spring 71 abuts shoulder 70. In this embodiment, fluid in the receiving chamber flows in through the pressure equalizing passage in a radial direction.

The pressure-equalizing valve of the present invention acts as a vacuum break to prevent a vacuum in the receiving chamber as the male is being removed from the female member. The invention reduces the force necessary to remove the male from the female member, especially in subsea conditions and/or where multiple coupling members are simultaneously disconnected. The invention of the present invention may be used or incorporated into virtually any coupling which has elastomeric or metal seals or any combination thereof, but is most advantageous in subsea hydraulic couplings of the foregoing type.

Although variations of the embodiment of the present invention may not each realize all of the advantages of the invention, certain features may become more important than others in various applications of the device. The invention, accordingly, should be understood to be limited only by the scope of the appended claims.

What is claimed is:

1. A hydraulic coupling comprising:
   (a) a female member having an internal bore and a slidable valve inserted therein for controlling fluid flow through the female member bore;
   (b) a male member insertable into the female member bore and having an internal bore and a slidable valve inserted therein for controlling fluid flow through the male member bore;

(c) at least one seal configured to form a fluid-tight seal between the female member bore and the male member; and (d) a pressure-equalizing passage extending between the female member bore and an external surface of the female member, and a valve in the passage biased to the closed position and openable in response to pressure at the external surface of the female member exceeding the bias force of the valve and internal pressure in the female member bore.

2. The hydraulic coupling of claim 1 wherein the pressure-equalizing valve comprises a ball valve, a valve seat, and a spring to urge the ball valve to seal against the seat.

3. The hydraulic coupling of claim 1 wherein the seal comprises a ring-shaped pressure-energized hollow metal seal.

4. The hydraulic coupling of claim 1 further comprising a retainer for holding the seal in place upon separation of the male member from the female member.

5. The hydraulic coupling of claim 4 wherein the retainer comprises a sleeve member configured to slide into the female member bore and a locking member engageable with the female member to hold the sleeve member in the female member bore.

6. The hydraulic coupling of claim 1 wherein the pressure-equalizing passage comprises a first radial passage extending outwardly from the female member bore, and a second longitudinal passage extending between the first radial passage and an end of the female member.

7. A female member of an undersea hydraulic coupling comprising:

(a) a body having a first end, a second end, and a bore extending therethrough;

(b) a first valve in the bore, biased to the normally closed position to prevent fluid flow through the bore, the first valve slidable towards the first end of the body into the open position in response to forces acting on the first valve sufficiently greater than the bias to urge the first valve closed;

(c) a pressure-equalizing passage connecting between the bore at a point intermediate the valve and the second end of the body; and (d) a second valve in the pressure-equalizing passage, and bias means to bias the second valve to the closed position to prevent fluid flow out from the bore through the passage, and allow fluid flow into the bore through the passage when external fluid pressure at the second end of the body exceeds the combined force of the bias means and internal fluid pressure in the bore.

8. The female undersea hydraulic coupling member of claim 7 wherein the second valve is a ball valve.

9. The female undersea hydraulic coupling member of claim 7 further comprising at least one circumferential seal in the bore, and means for retaining the seal in the bore.

10. The female undersea hydraulic coupling member of claim 7 wherein the first valve is a popper valve with a valve actuator.

11. An undersea hydraulic coupling comprising:

(a) a female member having a body with a longitudinal bore extending therethrough, at least one internal circumferential shoulder intermediate the bore, and a valve slidable in the bore and biased to close against a valve seat in the bore;

(b) at least one circumferential seal insertable into the bore and positionable on the at least one circumferential shoulder;

(c) a seal retainer engageable with the female member to hold the circumferential seal on the shoulder;

(d) a male member insertable into the longitudinal bore of the female member, the male member having a leading face and an outer surface sealingly engaging the circumferential seal therein during insertion into the longitudinal bore;

(e) a pressure-equalizing passage extending between the longitudinal bore and an outer surface of the female member body, the passage being positioned in the female member bore such that the male member remains sealingly engaged with the circumferential seal without blocking the passage; and (f) a ball valve in the pressure-equalizing passage, and bias means to urge the ball valve into the closed position unless fluid pressure outside the female member body exceeds the combined force of the bias means and the fluid pressure in the longitudinal bore.

12. The undersea hydraulic coupling of claim 11 wherein the circumferential seal comprises a ring-shaped hollow metal seal.

13. The undersea hydraulic coupling of claim 11 further comprising a seal seat engageable with the pressure-equalizing passage.

14. The undersea hydraulic coupling of claim 11 wherein the seal retainer comprises a sleeve-shaped member slidable into the longitudinal bore and a locking member configured to hold the sleeve-shaped member in the longitudinal bore.

15. The undersea hydraulic coupling of claim 11 further comprising a longitudinal bore in the male member and a valve slidable in the bore and biased to the closed position against a valve seat in the bore, the valves in the male and female members having mutually engageable valve actuators configured to urge the valves open.

16. The undersea hydraulic coupling of claim 11 wherein the pressure-equalizing passage comprises a first radial section interconnected with a second longitudinal section.

* * * * *